United States Patent Office.

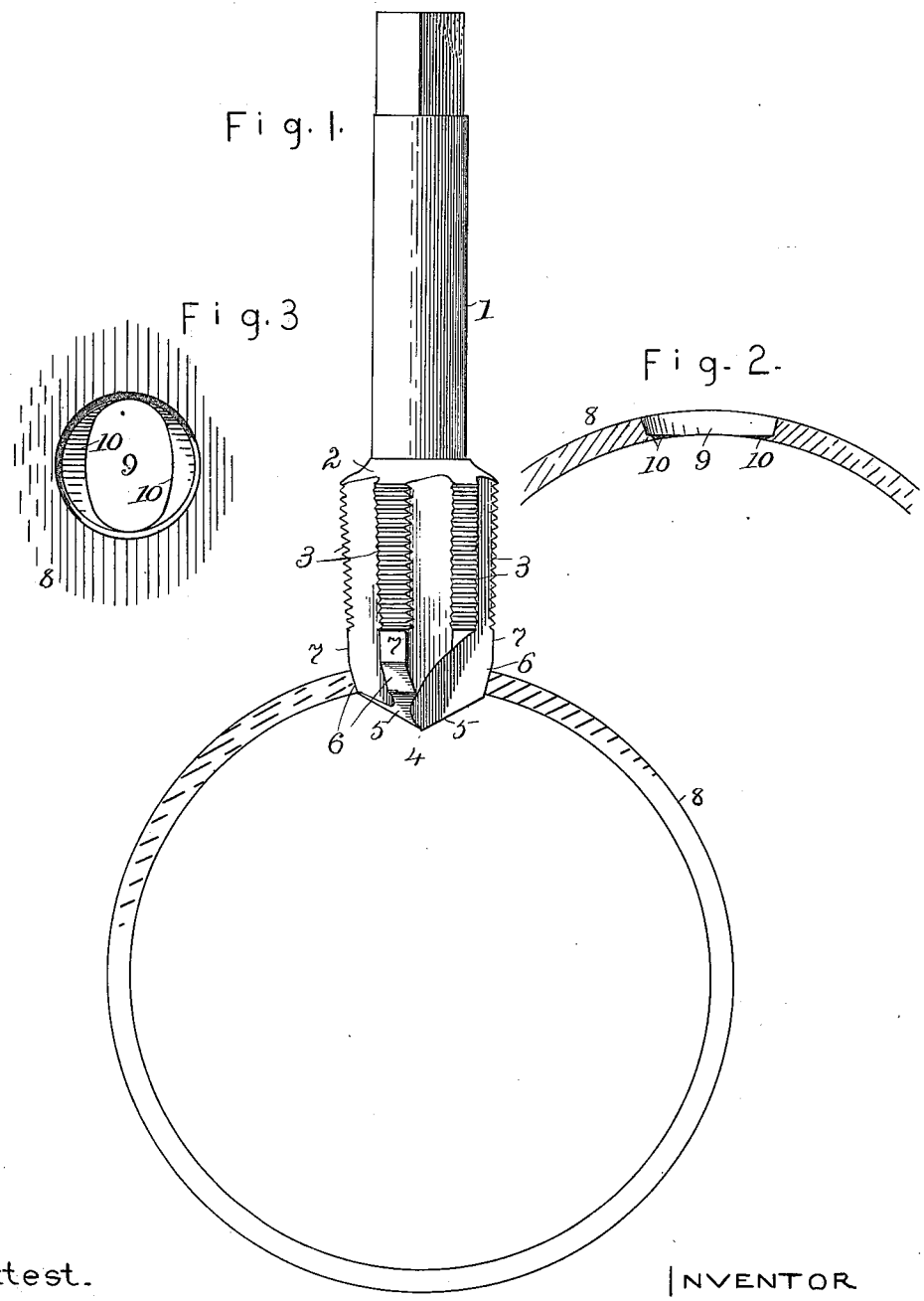

HIERONYMUS MUELLER, OF DECATUR, ILLINOIS.

DRILL FOR TAPPING PIPES.

SPECIFICATION forming part of Letters Patent No. 623,614, dated April 25, 1899.

Application filed December 3, 1898. Serial No. 698,162. (No model.)

*To all whom it may concern:*

Be it known that I, HIERONYMUS MUELLER, of Decatur, in the county of Macon and State of Illinois, have invented certain new and useful Improvements in Drills for Tapping Pipes, of which the following is a specification.

In drilling into a pipe that is circular in cross-section the drill first cuts away the highest part of the metal, forming an oblong opening which gradually assumes a circular form as the drilling is completed. Drills as commonly made are not increased materially in diameter above the widest part of the cutting edges. They are irregular in form viewed from the end, and the result is that they tend to drop through the incomplete oblong openings and impede the cutting away of the webs of metal on the inside of the pipe at the lower edges of the hole. It is my object to overcome this difficulty, while producing a drill in other respects superior, and I attain my object by means exemplified in the structure hereinafter described, and defined in the appended claim.

In the drawings forming part of this specification, Figure 1 is a representation of a combined tap and drill constructed in accordance with my invention, the same being shown in the act of drilling into a circular pipe. Fig. 2 is a cross-section of a fragment of pipe, showing a hole drilled therethrough, but not entirely completed. Fig. 3 is a plan of the fragment of pipe and hole therein shown in cross-section in Fig. 2.

The stem of the drill is shown at 1 and the head thereof at 2.

At 3 are shown tap-ribs, formed on the head of the drill in the customary manner.

The point of the drill is shown at 4, the cutting edges at 5, and at 6 are shown reamer-surfaces diverging gradually from the largest diameter of the cutting edges 5 and merging into the nearly-parallel surfaces 7.

A section of pipe is shown at 8, a partly completed hole therein at 9, and at 10 are shown webs of metal that must be removed to complete the hole and make it circular.

The cutting edges 5 taper very abruptly, while the reamer-surfaces 6 taper rather gradually and the surfaces 7 are nearly parallel. The operation of the drill is the same as usual until the hole is cut partly through and the drill reaches a point at which without special provision the blades or ribs would drop downward into the elongated hole. At this juncture the gradually-tapered reamer-surfaces bear against correspondingly-tapered surfaces of the hole in the pipe and hold the drill from plunging into the hole when its ribs are in favorable position.

While the surfaces 6 are holding the drill against undesirable and irregular motion they are also acting as reamers to true up the hole preparatory to tapping the same, and after they have passed entirely through the metal of the pipe the tapping is completed in the usual way.

What I claim is—

A drill for tapping pipes and the like having gradually-tapered tap-ribs, abruptly-tapered cutting edges and reamer edges extending from the cutting edges to the tap-ribs, such reamer edges being tapered more than the tap-ribs and less than the cutting edges, substantially as set forth.

In testimony whereof I sign my name in the presence of two subscribing witnesses.

HIERONYMUS MUELLER.

Witnesses:
ALBERT H. BARBER,
PAUL T. HAWES.